(12) United States Patent
Xu

(10) Patent No.: US 10,458,142 B1
(45) Date of Patent: Oct. 29, 2019

(54) ANTI-LOOSENING ENDCAP FOR UTILITY CROSSARM

(71) Applicant: Wedax Corporation, Suzhou (CN)

(72) Inventor: Xueming Xu, Suzhou (CN)

(73) Assignee: Wedax Corporation, Suzhou (CN)

( * ) Notice: Subject to any disclaimer, the term of this patent is extended or adjusted under 35 U.S.C. 154(b) by 0 days.

(21) Appl. No.: 16/174,663

(22) Filed: Oct. 30, 2018

(51) Int. Cl.
E04H 12/00 (2006.01)
F16B 21/07 (2006.01)
E04H 12/24 (2006.01)

(52) U.S. Cl.
CPC ......... E04H 12/003 (2013.01); F16B 21/071 (2013.01); E04H 12/24 (2013.01)

(58) Field of Classification Search
CPC ..... E04H 12/003; E04H 12/24; F16B 21/071; Y10T 403/7075; Y10T 403/7077; Y10T 403/7079; Y10T 403/7081; Y10T 403/7086
USPC ...................... 70/34, 386; 285/316
See application file for complete search history.

(56) References Cited

U.S. PATENT DOCUMENTS

| | | | | |
|---|---|---|---|---|
| 5,231,236 A * | 7/1993 | Del Real | ................. | F41A 17/44 42/70.11 |
| 5,480,108 A * | 1/1996 | Amiand | ................. | B64F 1/125 244/115 |
| 5,803,689 A * | 9/1998 | Magnus | ............. | E21B 41/0007 411/355 |
| 5,816,621 A * | 10/1998 | Frost | ....................... | F16L 37/56 285/1 |
| 6,675,615 B1 * | 1/2004 | Williams | ................. | B63J 99/00 292/288 |
| 6,684,670 B1 * | 2/2004 | Agbay | .................. | E05B 67/365 70/14 |
| 6,813,918 B2 * | 11/2004 | Reese | ................... | E05B 67/365 70/34 |
| 6,834,469 B2 * | 12/2004 | Fingerson | ............... | E04H 12/24 52/309.11 |
| 7,963,759 B1 * | 6/2011 | Morey | .................... | B29C 45/66 425/192 R |
| 8,720,874 B2 * | 5/2014 | Tschida | ................. | F16B 19/109 269/229 |
| 9,028,184 B2 * | 5/2015 | Bone | .................... | F16B 13/0833 411/21 |
| 9,546,498 B2 * | 1/2017 | Britt, Jr. | ................. | B32B 27/065 |
| 9,752,713 B2 * | 9/2017 | Tiberghien | .............. | F16L 37/42 |
| 9,790,704 B2 * | 10/2017 | Britt, Jr. | ................ | B32B 27/065 |

(Continued)

Primary Examiner — Joshua K Ihezie
(74) Attorney, Agent, or Firm — Marin Patents LP; Gustavo Marin

(57) ABSTRACT

An anti-loosening endcap for utility crossarm comprising an endcap body inserted into the crossarm, where a channel perpendicular to an inner wall of the crossarm is disposed inside the endcap body, one end of the channel is open, the pointed head pin is slidably disposed in the channel, the pointed head of the pointed head pin faces the inner wall of the crossarm, the endcap is further provided with an axial through passage, the passage and the channel intersect at the tail portion of the pointed head pin, and the corresponding pin is provided for the passage. The pin is driven into the passage, and the pin presses the tail portion of the pointed head pin, so that the pointed head of the pointed head pin pierces the inner wall of the crossarm, thereby providing a locking effect.

5 Claims, 2 Drawing Sheets

(56) References Cited

U.S. PATENT DOCUMENTS

| | | | |
|---|---|---|---|
| 2003/0170074 A1* | 9/2003 | Mills | F16B 19/109 |
| | | | 403/324 |
| 2004/0084582 A1* | 5/2004 | Kralic | E04H 12/24 |
| | | | 248/219.3 |
| 2016/0208510 A1* | 7/2016 | Britt, Jr. | B32B 27/065 |
| 2018/0031625 A1* | 2/2018 | Pezzin | G01R 31/025 |
| 2018/0100323 A1* | 4/2018 | Burbank | E04H 12/24 |
| 2018/0195306 A1* | 7/2018 | Wiles | E04C 3/06 |
| 2018/0334293 A1* | 11/2018 | Kadel | E04H 12/24 |

* cited by examiner

ANTI-LOOSENING ENDCAP FOR UTILITY CROSSARM

CROSS-REFERENCE TO RELATED APPLICATIONS

This application is a continuation of Chinese utility mode application number 2018209145781, filed Jun. 13, 2018, entitled "ANTI-LOOSENING ENDCAP FOR UTILITY CROSSARM", the entire content of which is incorporated herein by reference.

BACKGROUND OF THE INVENTION

Field of the Art

The present invention relates to the technical field of electric power equipment, and specifically, to an endcap for utility crossarm.

Discussion of the State of the Art

When a composite tube is used as a utility crossarm, endcaps need to be mounted on two ends of the composite tube. Because the crossarm is used in the open air and is exposed to the sun and rain, it should be ensured that the endcaps of the crossarm do not fall off. However, it is difficult to ensure that commonly used endcaps are firmly mounted and do not fall off during long-term use.

SUMMARY OF THE INVENTION

A technical problem to be resolved by the present invention is to provide an anti-loosening endcap for the utility crossarm.

To resolve the foregoing technical problem, the present invention is implemented by using the following technical solution: An anti-loosening endcap of the crossarm includes an endcap body inserted into the crossarm, where a channel perpendicular to an inner wall of the crossarm is disposed inside the endcap body, one end of the channel is open, a pointed head pin is slidably disposed in the channel, the pointed head of the pointed head pin faces the inner wall of the crossarm, the endcap is further provided with an axial through passage, the passage and the channel intersect at a tail portion of the pointed head pin, and a corresponding pin is provided for the passage.

In a preferred embodiment, there are two channels intersecting with each other, and the passage intersects with an intersecting point of the two channels.

In a preferred embodiment, there, two ends of the channel are open.

In a preferred embodiment, there, two-pointed head pins in opposite directions are disposed in each channel, and the passage intersects with the channels at a channel center.

In a preferred embodiment, there, the passage is provided with a counterbore on an outer end face of the endcap.

The endcap is easy to mount and highly universal because the pin can be simply driven into the passage by using a universal hammer, without requiring any special tool. The pointed head pin is jabbed from the inner wall of the crossarm without damaging outer surface of the crossarm.

The present invention has the following beneficial effects: The pin is driven into the passage, and the pin presses the tail portion of the pointed head pin, so that the pointed head of the pointed head pin pierces the inner wall of the crossarm, thereby providing an effect of locking the endcap and preventing the endcap from loosening and falling off from the crossarm. The endcap is easy to mount and highly universal because the pin can be simply driven into the passage by using a hammer, without requiring any special tool. The pointed head pin is jabbed from the inner wall of the crossarm without damaging outer surface of the crossarm.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 1:
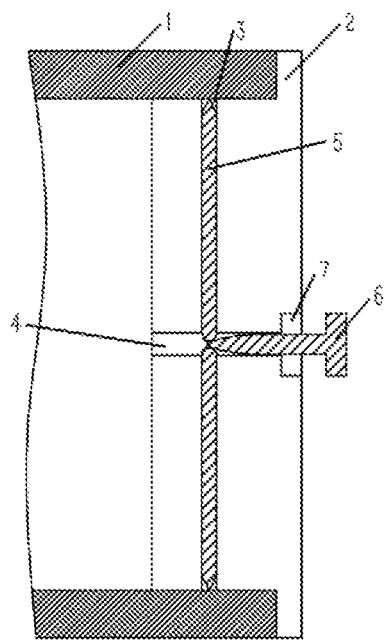
FIG. 1 is a schematic transverse cross-sectional view according to a first embodiment of the invention.

The drawings use the following reference numerals:
1: Crossarm;
2: End cover;
3: Channel;
4: Passage;
5: Pointed head pin;
6: Pin;
7: Counterbore.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

The following describes the present invention in detail with reference to the accompanying drawings and specific implementations.

Figure 2:
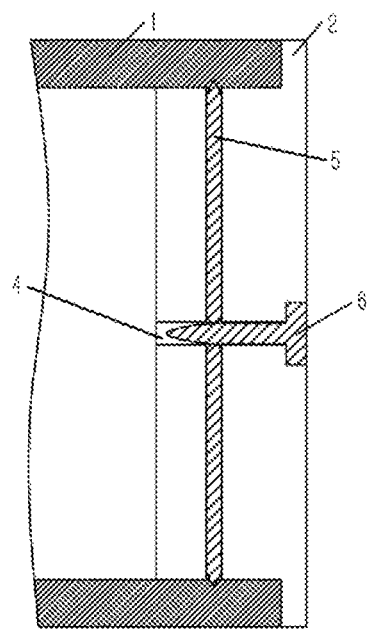
FIG. 2 is a schematic layout diagram of a preferred embodiment of the present invention in a fixed state.
Figure 3:
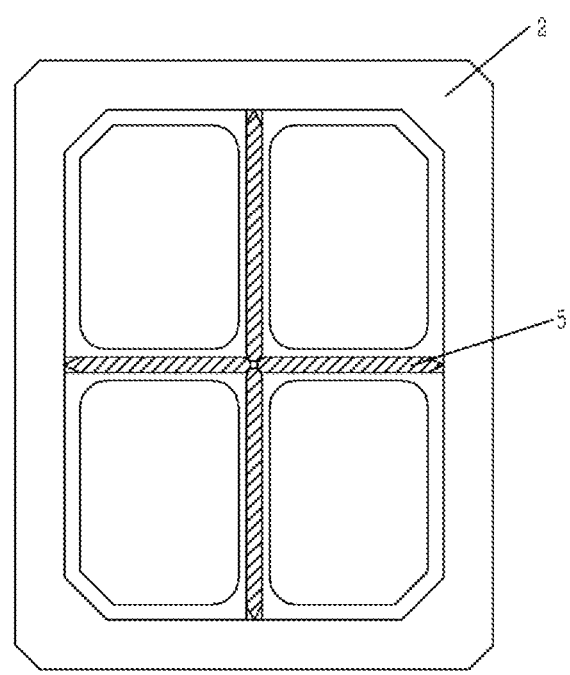
FIG. 3 is a schematic cross-sectional view of channels of a preferred embodiment of the present invention.

As shown in FIG. 1 to FIG. 3, a channel 3 perpendicular to an inner wall of a crossarm is disposed inside an endcap body that is of an endcap 2 and that is inserted into the crossarm 1, there are two channels 3 intersecting with each other at a center, and two ends of the channel 3 are open. Two-pointed head pins 5 in opposite directions are slidably disposed in each channel 3, and a pointed head of the pointed head pin 5 faces the inner wall of the crossarm 1. The endcap 2 is further provided with an axial through passage 4, the passage 4 intersects with an intersecting point of the two channels 3, and passage 4 is provided with a counterbore 7 on an outer end face of the endcap 2. A corresponding pin 6 is provided for the passage 4.

FIG. 1 and FIG. 3 each show a non-fixed state of the endcap 2. In this case, the pointed head pins 5 are located in the channels 3, and tail portions of the pointed head pins are in contact with each other. After the pin 6 is driven into the passage 4, the pin presses the tail portions of the pointed head pins 5, so that the pointed head pins 5 are jabbed into the inner wall of the crossarm 1 in the channels 3, and the pointed heads of the pointed head pins 5 pierce the inner wall of the crossarm 1, thereby providing an effect of locking the endcap and preventing the endcap from loosening and falling off.

FIG. 2 is a schematic layout diagram of a preferred embodiment of the present invention in a fixed state. According to the embodiment, pin 6 is shown in a driven state into passage 4, the pin presses the tail portions of the pointed head pins 5, so that the pointed head pins 5 are jabbed into the inner wall of crossarm 1 in the channels 3 (referring to FIG. 1), and the pointed heads of the pointed head pins 5 pierce the inner wall of the crossarm 1, thereby providing an effect of locking the endcap and preventing the endcap from loosening and falling off.

It should be emphasized that the foregoing descriptions are merely preferred embodiments of the present invention and are not intended to limit the present invention in any form. Any simple alteration, equivalent change or modification made to the foregoing embodiments according to the technical essence of the present invention shall fall within the scope of the technical solutions of the present invention.

The skilled person will be aware of a range of possible modifications of the various embodiments described above. Accordingly, the present invention is defined by the claims and their equivalents.

What is claimed is:

1. An anti-loosening endcap for a utility crossarm comprising:
   an endcap body inserted into the crossarm;
   wherein a channel perpendicular to an inner wall of the crossarm is disposed inside the endcap body, one end of the channel is open, a pointed head pin is slidably disposed in the channel, the pointed head pin, operable to pierce the inner wall of the crossarm, faces the inner wall of the crossarm, the endcap is further provided with an axial through passage, the passage and the channel intersect at a tail portion of the pointed head pin, and a corresponding pin is provided for the passage.

2. The anti-loosening endcap according to claim 1, wherein there are two channels intersecting with each other, and the passage intersects with an intersecting point of the two channels.

3. The anti-loosening endcap according to claim 2, wherein two-pointed head pins in opposite directions are disposed in each channel, and the passage intersects with the channel at a channel center.

4. The anti-loosening endcap according to claim 1, wherein two ends of the channel are open.

5. The anti-loosening endcap according to claim 1, wherein the passage is provided with a counterbore on an outer end face of the endcap.

\* \* \* \* \*